United States Patent [19]
Lübbe et al.

[11] Patent Number: 6,101,257
[45] Date of Patent: Aug. 8, 2000

[54] AUDIO SIGNAL PROCESSOR

[75] Inventors: Jürgen Lübbe, Jacobneuharting; Peter Kirchlechner, Hohenthann; Jörg Schambacher, München, all of Germany

[73] Assignee: SGS-Thomson Microelectronics GmbH, Germany

[21] Appl. No.: 08/900,930

[22] Filed: Jul. 25, 1997

[30] Foreign Application Priority Data

Jul. 26, 1996 [DE] Germany ............................ 196 30 330

[51] Int. Cl.⁷ .................................................. H03G 5/00
[52] U.S. Cl. ........................ 381/101; 333/28 T; 455/267
[58] Field of Search .................................. 381/101, 104, 381/2–3, 123, 98; 333/28 T; 455/180.1, 180.3, 180.4, 182.1, 182.2, 182.3, 183.1, 184.1, 187.1, 190.1, 191.1, 191.2, 191.3, 192.1, 192.3, 196.1, 197.1, 197.2, 197.3, 199.1, 258, 260–262, 192.2

[56] References Cited

U.S. PATENT DOCUMENTS

| | | | |
|---|---|---|---|
| 4,262,260 | 4/1981 | Tamura | 381/10 |
| 4,388,493 | 6/1983 | Maisel | 381/4 |
| 4,658,427 | 4/1987 | Aubin | 381/124 |
| 5,001,757 | 3/1991 | Field et al. | 381/106 |
| 5,127,058 | 6/1992 | Yamasaki et al. | 381/102 |
| 5,172,358 | 12/1992 | Kimura | 381/102 |
| 5,241,696 | 8/1993 | Mori et al. | 381/101 |
| 5,530,924 | 6/1996 | Miller | 381/101 |
| 5,574,997 | 11/1996 | Hong | 455/180.1 |
| 5,666,430 | 9/1997 | Rzeszewski | 381/102 |
| 5,708,723 | 1/1998 | Nishino | 381/101 |
| 5,802,187 | 9/1998 | Hsu | 381/104 |

FOREIGN PATENT DOCUMENTS

| | | |
|---|---|---|
| WO 84/02416 | 6/1984 | European Pat. Off. . |
| 44 07 701 A1 | 9/1995 | Germany . |
| 56-102132 | 8/1981 | Japan ............................ 455/180.1 |

*Primary Examiner*—Minsun Oh Harvey
*Assistant Examiner*—Xu Mei
*Attorney, Agent, or Firm*—Theodore E. Galanthay; E. Russell Tarleton; Seed IP Law Group, PLLC

[57] ABSTRACT

An audio signal processor is disclosed which has at least one audio signal input and at least one audio signal output as well as at least one control input, and an audio signal processing unit connected between audio signal input and audio signal output, the audio signal processing unit having a programmable indicator tone generator circuit to be driven via the control input and whose indicator tone signal is switched to the audio signal output in accordance with the state of the control input.

25 Claims, 6 Drawing Sheets

AUDIO SIGNAL PROCESSOR

TECHNICAL FIELD

This invention relates to an audio signal processor as is used in particular in certain entertainment electronics devices. The audio signal processor is especially suitable for use in compact audio receivers, in particular in devices intended to be installed in motor vehicles (car radios).

BACKGROUND OF THE INVENTION

With devices in the area of entertainment electronics in general and radio receivers in particular, it is frequently expedient or even necessary to acknowledge each manual control operation by the user with a short indicator tone. This applies particularly to compact radio receivers intended to be built into motor vehicles. One must assume that such devices must be frequently operated by the driver when driving. During the control operation the driver can direct only a small part of his attention to the control operation. He must continue to keep his vehicle under control. So he is often unable for example to look closely at a frequency display indicating whether a desired station finding has been performed successfully. If the radio receiver is equipped with an apparatus producing an indicator tone as soon as a control operation has been performed, for example the pressing of a button in the control panel, it is no longer absolutely necessary for the driver to direct his eyes to the display apparatus of the receiver.

With compact radio receivers as are used in particular for equipping motor vehicles, a trend has been apparent for some time to reduce costs during production by putting the entire electric circuit of the receiver together from very few large-scale integrated electronic components.

Figure 4:
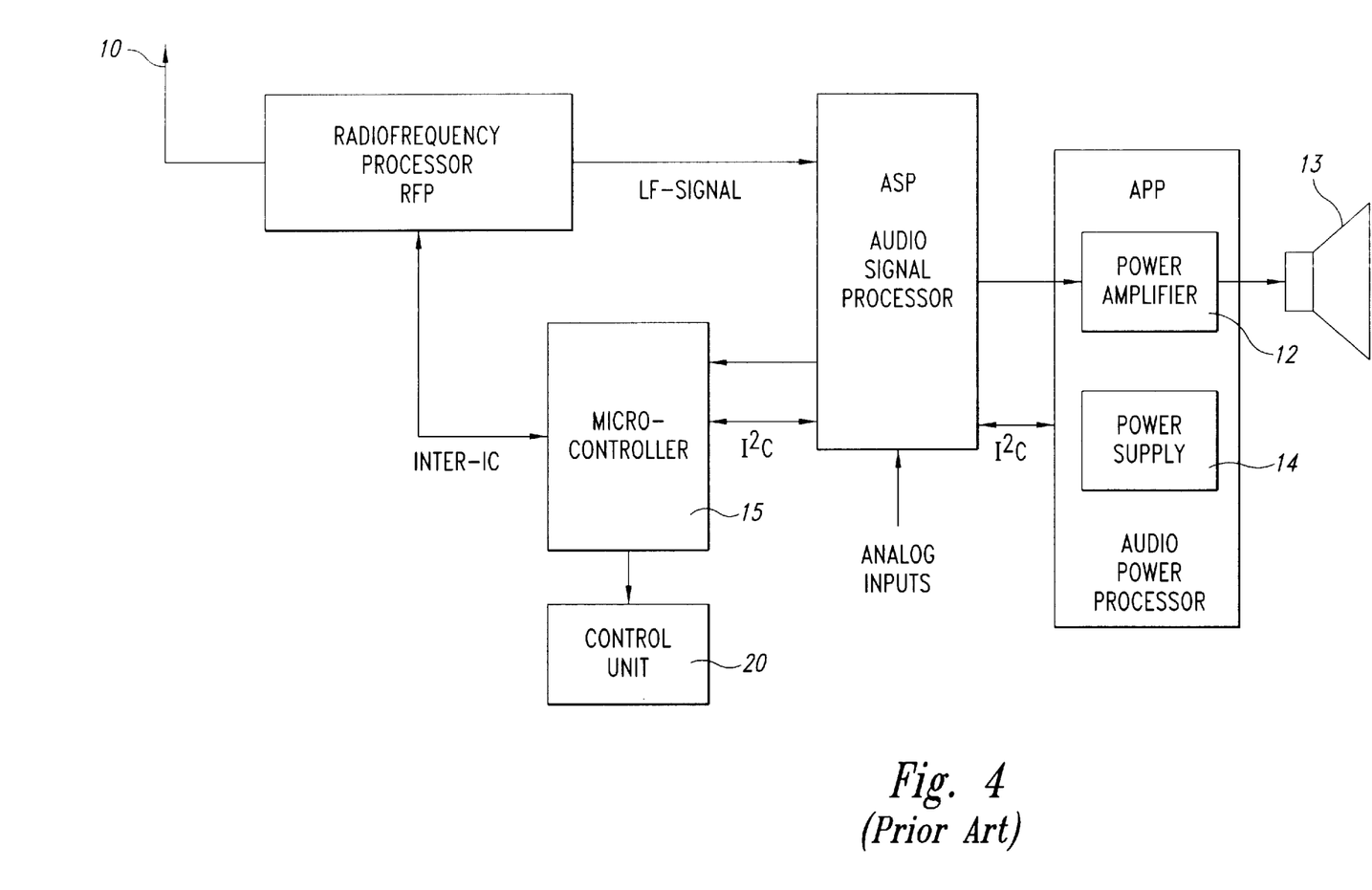
FIG. 4 shows a schematic block diagram of a prior art audio receiver.

FIG. 4 shows a block diagram of an exemplary audio receiver. High frequency signals delivered by radio frequency antenna 10 are supplied to radio frequency processor RFP. Radio frequency processor RFP comprises high frequency preamplifiers, tuners, intermediate frequency amplifiers and filters as well as demodulators. A low frequency signal constituting the wanted signal from the received transmitter is supplied to audio signal processor ASP. This low frequency signal includes not only the demodulated audio signal but also auxiliary signals for stereo reception, ARI identification, RDS, etc., and others.

Audio signal processor ASP converts in particular the low frequency signal delivered by radio frequency processor RFP into audio signals which are supplied to audio power processor APP. Audio power processor APP includes in particular power amplifier 12 which amplifies the output signals delivered by audio signal processor ASP until they can be reproduced by loudspeakers 13. Further, audio power processor APP includes voltage regulator module 14 for power supply.

Other audio signals, for example from cassette recorders, compact disk players or the like, can be fed to audio signal processor ASP via further analog inputs.

The described audio receiver is controlled as a whole by microcontroller 15 connected with control unit 20 accessible to the user. The data exchange between microcontroller 15, on the one hand, and radio frequency processor RFP, audio signal processor ASP and audio power processor APP, on the other hand, takes place through a conventional inter-IC-bus.

Figure 5:
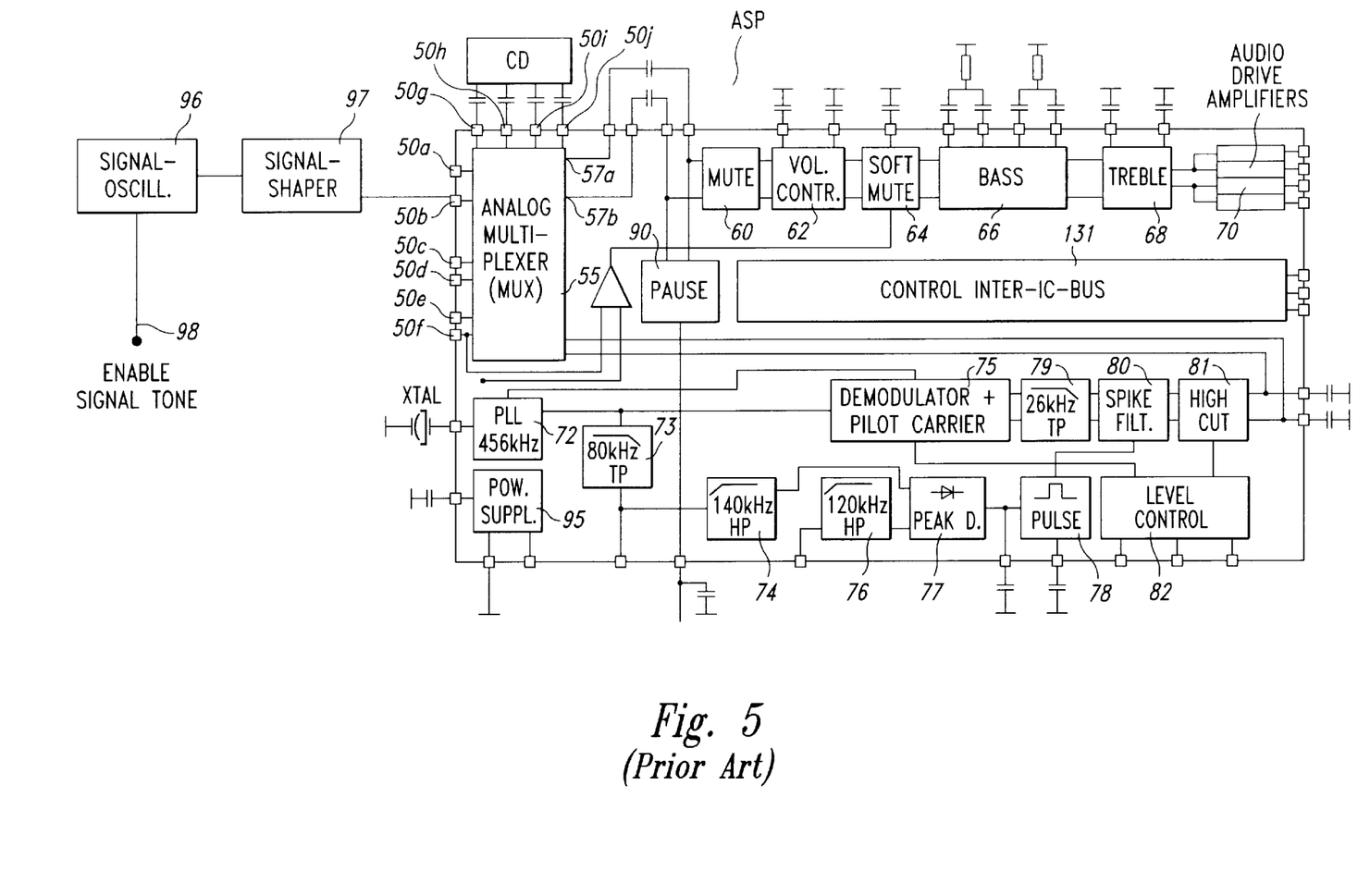
FIG. 5 shows a schematic block diagram of an audio signal processor of the audio receiver of FIG. 4 with some peripheral wiring.

FIG. 5 shows a schematic block diagram of audio signal processor ASP of the audio receiver shown in FIG. 4. Audio signal processor ASP has a number of analog audio signal inputs 50a to 50j connected with corresponding input lines of analog multiplexer 55. A stereo output signal from analog multiplexer 55 is fed via output lines 57a and 57b to a chain of series connected signal treating apparatuses 60, 62, 64, 66, 68.

First the audio signals pass into mute switching filter 60, then successively into volume control 62, second mute switching configuration with a soft mute switching property 64, bass control 66 and treble control 68. The stereo audio signals are then fed to a number of audio drive amplifiers 70 where they are conditioned until they are suitable for the drive of the power output stages in power amplifier 12 within audio power processor APP.

Each channel of the stereo signal is thereby divided into a first subchannel for a first loudspeaker to be mounted at the front of the passenger cubicle and a second subchannel for a second loudspeaker to be mounted at the back of the passenger compartment.

Further, the audio signal processor has a number of usual functional blocks 72 to 82 necessary for processing a stereo difference signal, an ARI signal, etc. In particular, a phase-locked loop (PLL) oscillator produces a 456 kHz signal that is phase locked with a stereo pilot signal as is known in the art. Finally, pause switching element 90 and power supply device 95 are provided.

In order to permit an indicator tone to be produced when a control operation is performed on control unit 20 of microcontroller 15, the audio receiver known from FIG. 5 has square wave signal oscillator 96 connected to analog signal input 50b of analog multiplexer 55 of audio signal processor ASP via signal shaper 97. Signal oscillator 96 can be designed for example as an a stable trigger element. However it is also possible to acquire a suitable square wave signal directly through microcontroller 15 if a program loop is executed which switches an output port (not shown) of microcontroller 15 connected with the input of signal shaper 97 alternatingly from a low level to a high level and vice versa with a predetermined time delay.

Since the reproduction of a straight square wave signal as an indicator tone in the loudspeakers leads to an undesirable and annoying sound, it is desirable to reduce the overtone content of the signal by signal shaper 97. Signal shaper 97 filters the square wave signal delivered by the signal oscillator so as to yield approximately a sinusoidal signal which is fed to analog multiplexer 55.

Signal oscillator 96 has enable input 98. When enable input 98 is held at a first electric level, signal oscillator 96 is blocked. When enable input 88 is put at a second electric level, signal oscillator 96 produces the square wave signal and an indicator signal becomes audible in loudspeaker 13 as soon as the corresponding input on analog multiplexer MUX is activated.

To permit signal shaper 97 to filter out the overtones of the square wave signal produced by signal oscillator 96 with sufficient quality without excessive damping of the base frequency, signal shaper 97 is dimensioned for a predetermined base frequency of signal oscillator 96 in the prior art.

This leads to the problem that only one preselected pitch of the indicator tone is possible in the known radio receiver shown in FIGS. 4 and 5. It would be desirable to be able to produce a multiplicity of different sounding indicator tones in an improved receiver in order to distinguish, for example, a successful control operation from one which did not cause the device to react in the way expected by the user (acoustic error message).

It is clear that audio signal processor ASP shown in FIGS. 4 and 5 is not the only possible embodiment of such a processor. In particular the audio signal processor can also be implemented without the functional units for treating FM stereo signals. The kind and number of audio frequency stages for influencing the audio signal can also vary in individual cases.

Even using only one indicator tone, the prior art circuit configuration of FIG. 5 has the disadvantage that it necessitates additional external components outside audio signal processor ASP preferably executed as an integrated circuit. When audio signal processor ASP is executed as an integrated circuit, another disadvantage is that a further signal input and thus a further package pin are necessary.

SUMMARY OF THE INVENTION

A problem addressed by the present invention is to provide an audio signal processor which permits different indicator tones to be produced and which can be easily executed as an integrated component with very little external wiring.

This problem is solved according to the invention by an audio signal processor with the features of claim 1. Preferred developments are stated in the subclaims.

DETAILED DESCRIPTION OF THE INVENTION

Figure 1:
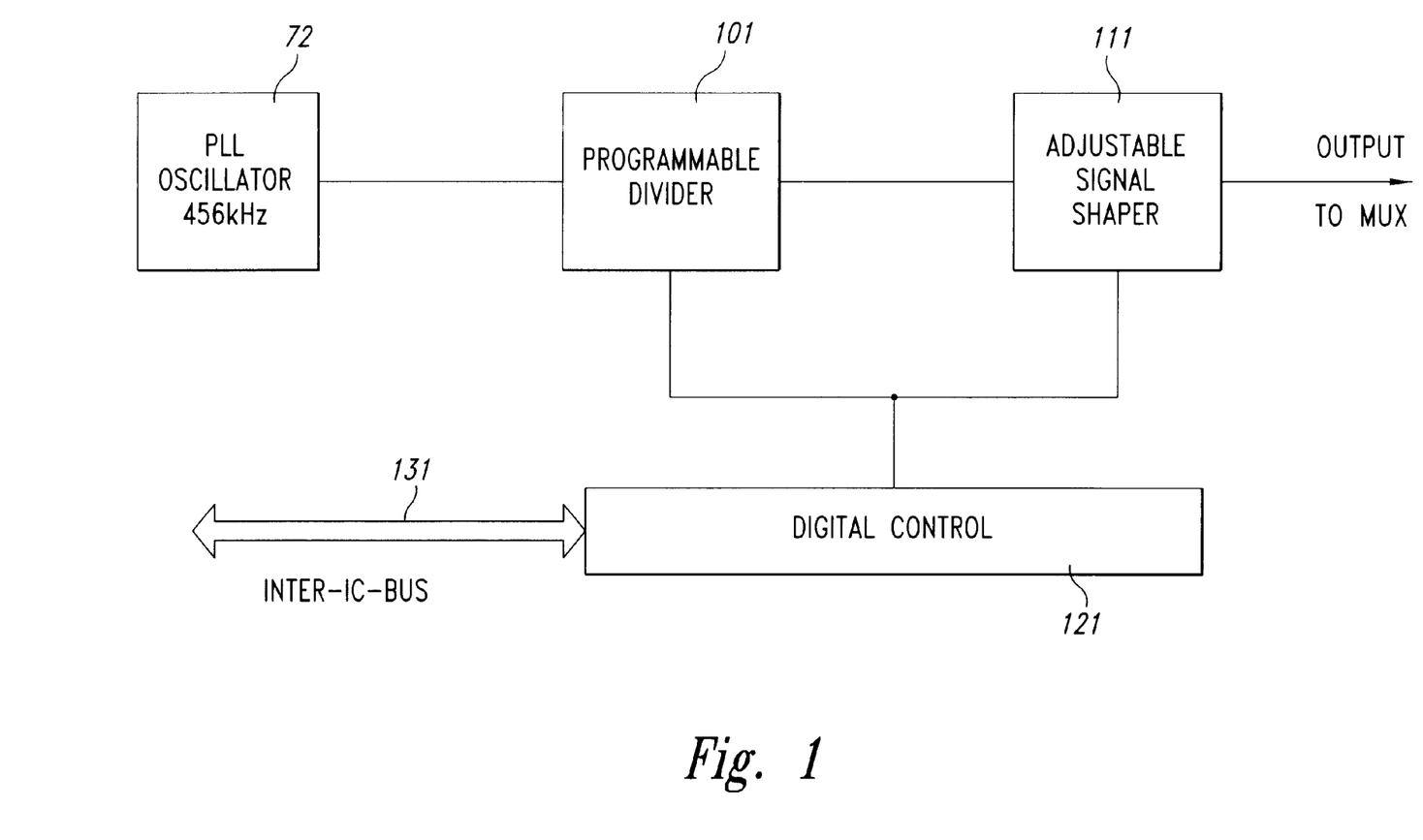
FIG. 1 shows a schematic block diagram of part of an embodiment of an inventive audio signal processor for producing a programmable indicator tone.

FIG. 1 shows a schematic block diagram of part of an embodiment of an inventive audio signal processor ASP for producing a programmable indicator tone. The circuit shown in FIG. 1 is suitable in particular for integration with the known audio signal processor ASP as shown in FIG. 5.

To recover the stereo sound in stereo broadcasts in audio signal processor ASP shown in FIG. 5, it is necessary to detect a 19 kHz stereo pilot signal modulated upon the wanted signal and use it to reconstruct a 38 kHz carrier required for acquiring the channel difference signal. For this purpose, phase-locked loop (PLL) oscillator 72 is provided which is locked exactly with the 19 kHz stereo pilot signal. A corresponding voltage-controlled oscillator (VCO, not shown) of the PLL oscillator outputs a signal at a frequency of 456 kHz.

Although the basic signal for acquiring the indicator tone signal can in principle be obtained from other oscillators, it is advantageous to use the oscillators already present in the circuit of audio signal processor ASP. It is especially advantageous to fall back on the output of phase-locked oscillator 72 since its output frequency of 456 kHz is not too high so that the effort for stepping down the frequency stays within limits, and since this frequency is sufficiently stable.

In the embodiment shown in FIG. 1, a 456 kHz signal is therefore picked up from phase-locked oscillator circuit 72 and fed to an input of programmable divider 101. The output of programmable divider 101 is connected with the input of adjustable signal shaper 111. The output of adjustable signal shaper 111 is connected internally with an input (not shown) of analog multiplexer 55 of FIG. 5.

The division ratio of programmable divider 101 and the filter characteristic of adjustable signal shaper 111 are controlled by digital control 121. Digital control 121 is connected with microcontroller 15 (FIG. 4) via inter-IC-bus 131. A control program running in microcontroller 15 determines the division ratio of programmable divider 101 and the filter characteristic of adjustable signal shaper 111 via the inter-IC-bus and digital control 121.

To produce, for example, an indicator tone with a frequency of 1 kHz, programmable divider 101 is operated with a division ratio of 1:456. Further, the characteristics of adjustable signal shaper 111 should be programmed such that a square wave signal, with a frequency of 1 kHz available at the input of adjustable signal shaper 111, is filtered in an expedient way so as to attenuate the overtones without too greatly reducing the base frequency of 1 kHz.

Figure 2A:
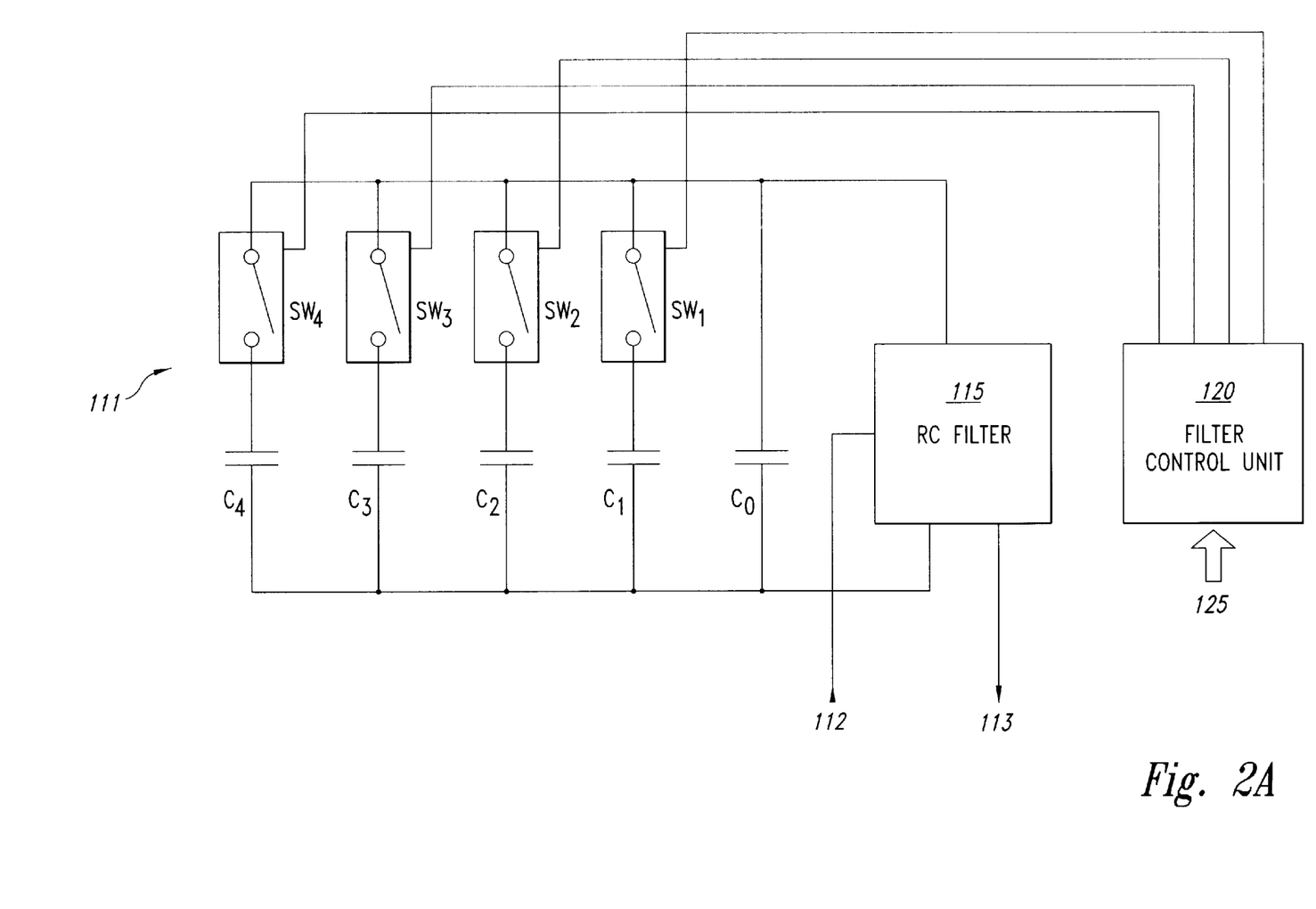
FIG. 2A shows a schematic block diagram of a first embodiment of an adjustable signal shaper employed in the inventive audio signal processor shown in FIG. 1.

FIG. 2A shows a schematic block diagram of a first embodiment of the adjustable signal shaper 111 from the detail shown in FIG. 1. The adjustable signal shaper includes RC filter 115 with input 112 and output 113. RC filter 115 is preferably executed as an active RC filter. However, other constructions are also possible, in particular, passive RC filters. The RC filter can also be implemented using an SC (switched capacitor) configuration.

Input connection 112 serves as the input of adjustable signal shaper 111 and output connection 113 as its output. In the present embodiment, the frequency response-determining capacitor of the RC filter is divided into partial capacitances $C_0$, $C_1$, $C_2$, $C_3$ and $C_4$. The circuit configuration is selected such that first capacitance $C_0$ is continually effective as the basic capacitance, whereas further partial capacitances $C_1$, $C_2$, $C_3$ and $C_4$ are adapted to be selectively activated or turned off via respectively associated switching devices $SW_1$, $SW_2$, $SW_3$ and $SW_4$.

Switching devices $SW_1$, $SW_2$, $SW_3$ and $SW_4$ are driven by filter control unit 120. Filter control unit 120 has an input executed as data bus 125 connected with digital control 121, and a separate output connection for each of switching devices $SW_1$, $SW_2$, $SW_3$, $SW_4$. In the described embodiment, filter control unit 120 is implemented as a decoder circuit, switching devices $SW_1$ to $SW_4$ being turned on and off according to a binary signal available at input 125. The filter control unit 120 can also be driven via special select lines instead of bus 125.

As is readily understandable, the invention is not restricted to a certain number of partial capacitances. For simpler cases of application it suffices to provide basic capacitance $C_0$ and only one connectable capacitance $C_1$ to permit filtering of two different square wave signals with different base frequencies.

Further, filter control unit 120 can be implemented in a simplified way if microcontroller 15 is designed so that the correct drive of the switching devices is performed via the inter-IC-bus 131 and digital control 121 under the control of the program running in the microcontroller.

Figure 2B:
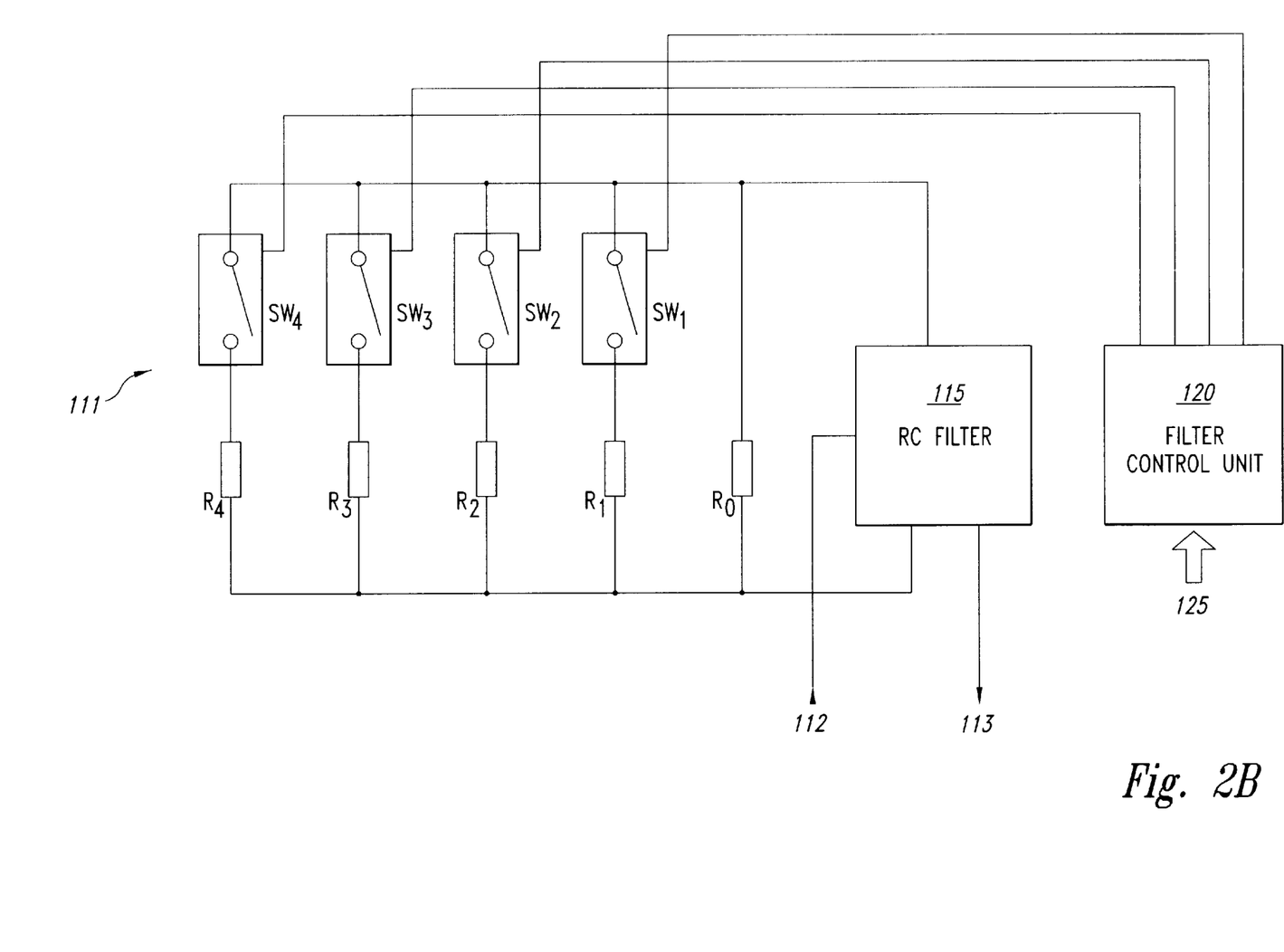
FIG. 2B shows a schematic block diagram of a second embodiment of an adjustable signal shaper employed in the inventive audio signal processor shown in FIG. 1.

Further, with RC filter 115 it is possible not, or not exclusively, to split capacitance C into partial capacitances $C_0, C_1, C_2, \ldots$ . One can just as well split resistance R into partial resistances $R_0, R_1, R_2, R_3$, and $R_4$ (FIG. 2B). Finally, it is possible to combine both approaches.

It is further evident that not only an adjustable parallel connection of capacitors or resistors but also a switchable series connection thereof can be used for varying the characteristics of the signal shaper (not shown).

Figure 3:
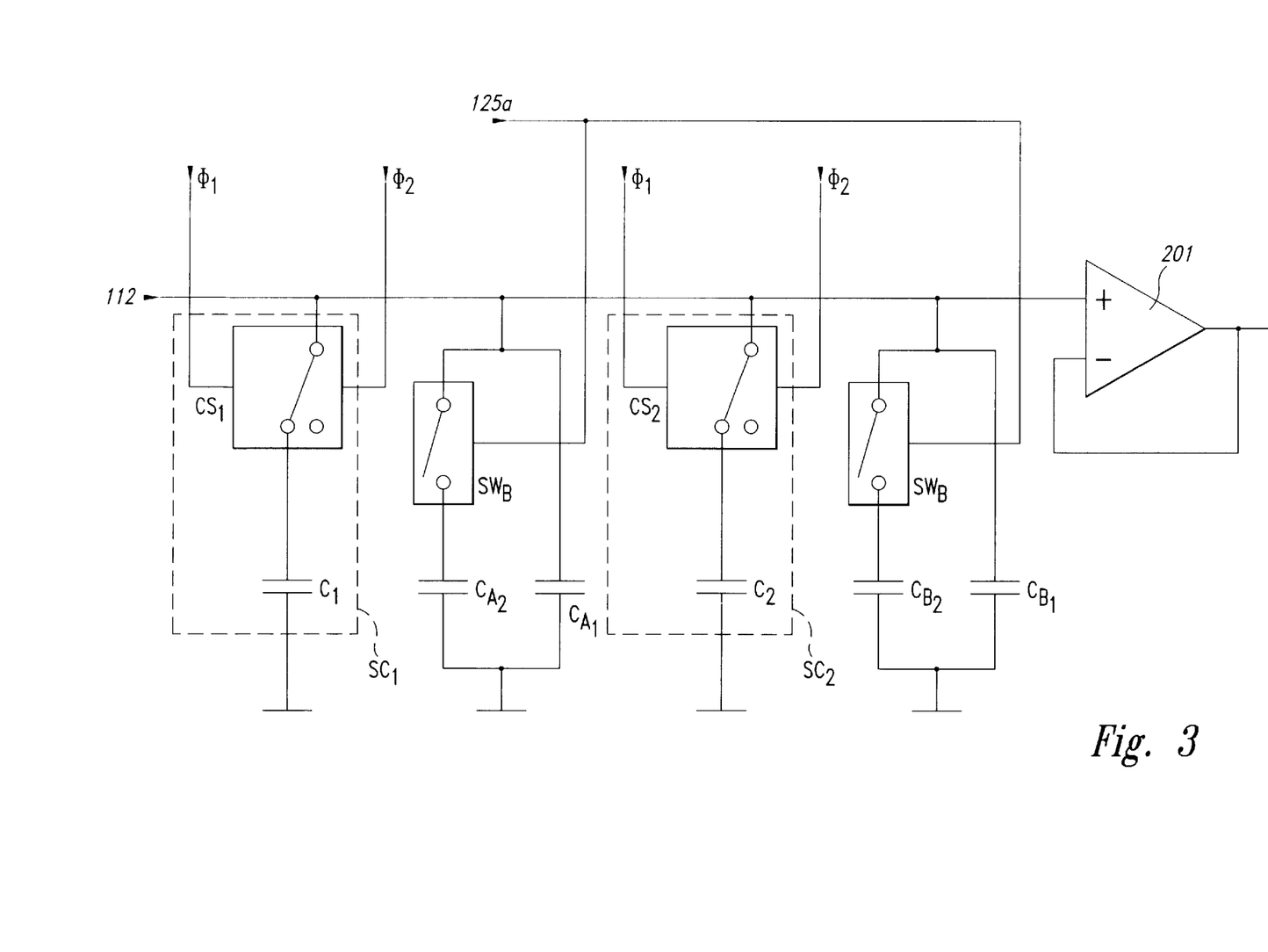
FIG. 3 shows a schematic circuit diagram of a third embodiment of the adjustable signal shaper of the inventive audio signal processor shown in FIG. 1.

FIG. 3 shows a schematic circuit diagram of a third embodiment of adjustable signal shaper 111 shown in FIG. 1.

The embodiment shown in FIG. 3 enables the filtering of two different indicator tones. The circuit shows schematically a second-order active RC filter with operational amplifier 201. A circuit for filtering more than two different indicator tones could easily be designed by a person of ordinary skill in the art in view of the circuit shown in FIG. 3.

To facilitate integration of the entire circuit shown in FIG. 3 in an integrated circuit, all RC modules are executed with resistors realized as switched capacitors (so-called "switched capacitor technique"). This switched capacitor technique as such is known and described for example in the monograph by Gregorian, Roubik and Temes, Gabor C., "Analog MOS Integrated Circuits for Signal Processing."

Operational amplifier 201 is implemented as a voltage follower, i.e., the inverting input of operational amplifier 201 is permanently connected with its output. The noninverting input of operational amplifier 201 receives the input signal available at input connection 112 via first switched capacitor $SC_1$ and second switched capacitor $SC_2$. The first switched capacitor $SC_1$ includes a first control switch $CS_1$ and a first capacitor $C_1$ and the second switched capacitor $SC_2$ includes a second control switch $CS_2$ and a second capacitor $C_2$. First switched capacitor $SC_1$ and second switched capacitor $SC_2$ are switched by first clock signal $\phi_1$ and by second clock signal $\phi_2$. As is usual in the SC technique, the two clock phases $\phi_1$, $\phi_2$ are designed so that their high-level (active) intervals at no time overlap. The signal path between first switched capacitor $SC_1$ and second switched capacitor $SC_2$ is connected with a reference potential (ground) via first frequency response-determining capacitor $C_{A1}$. The noninverting input of operational amplifier 201 is connected with the reference potential (ground) via second frequency response-determining capacitor $C_{B1}$.

Capacitor $C_{A2}$ is connectable in parallel with first frequency response-determining capacitor $C_{A1}$ via first switching device $SW_A$. Similarly, capacitor $C_{B2}$ is connectable in parallel with second frequency response-determining capacitor $C_{B1}$, via second switching device $SW_B$. Switching devices $SW_A$, $SW_B$ are switchable via control input 125$a$, which may be connected to the microcontroller 15. When a first potential is available at control input 125$a$, both switching devices $SW_A$, $SW_B$ are in the electrically nonconductive state, which causes the frequency response to be determined exclusively by capacitors $C_{A1}$, $C_{B1}$. When a second electric potential is applied to input 125$a$, electric switching devices $SW_A$, $SW_B$ become electrically conductive, which causes the sum of capacitance values $C_{A1}$ plus $C_{A2}$ or $C_{B1}$ plus $C_{B2}$ to be effective for the frequency response.

Switching devices $SW_A$ and $SW_B$ are implemented in the known way by MOS transistors in order to permit integration in an integrated circuit. The same applies to control switches $CS_1$ and $CS_2$.

Adjustable signal shaper 111 is of course not restricted to a second-order RC filter according to FIG. 3.

A further improvement of audio signal processor ASP results from providing a device which permits the indicator tone to fade over with the wanted audio signal. This can be realized, for example, by providing analog multiplexer 55 with a fade-over voltage divider (not shown) in the conventional way so that the desired effect occurs.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An audio signal processor, comprising:
   an audio signal input, an audio signal output, and a control input with a state;
   an audio signal processing unit connected between audio signal input and audio signal output, the audio signal processing unit having an integrated programmable indicator tone generator circuit to be driven via the control input, the indicator tone generator circuit having an indicator tone signal that is switched to the audio signal output in accordance with the state of the control input, the indicator tone generator circuit having a programmable frequency divider with an input and a division ratio, and an adjustable signal shaper that influences the signal shape of the indicator tone signal, the adjustable signal shaper being adjusted in accordance with the selected indicator tone signal by the state of the control input;
   the indicator tone generator circuit producing at least two different indicator tone signals in accordance with the state of the control input; and
   a phase-locked oscillator locked with a stereo pilot signal, the phase-locked oscillator producing an output signal that is applied to the input of the programmable frequency divider.

2. The audio signal processor of claim 1 wherein the adjustable signal shaper comprises:
   a) an RC filter with a frequency response-determining capacitance;
   b) a filter control unit; and
   c) one or more switching devices connected with one or more additional capacitances,
   d) the adjustable signal shaper being adjusted by each of the switching devices switching one or more of the additional capacitances in parallel or in series with the frequency response-determining capacitance of the RC filter under the control of the filter control unit.

3. The audio signal processor of claim 1 wherein the adjustable signal shaper comprises:
   a) an RC filter with a frequency response-determining resistor;
   b) a filter control unit; and
   c) one or more switching devices connected with one or more additional resistors,
   d) the adjustable signal shaper being adjusted by each of the switching devices switching one or more of the additional resistors in parallel or in series with the frequency response-determining resistor of the RC filter under the control of the filter control unit.

4. The audio signal processor of claim 3, further comprising at least one frequency response-determining resistor R of the RC filter is implemented by SC technology.

5. The audio signal processor of claim 1, further comprising:
   a) the input of the programmable frequency divider is connected with an output of an oscillator, and b) the division ratio of the programmable frequency divider is determined by the state of the control input.

6. The audio signal processor of claim 1 wherein:

the input of the programmable frequency divider is connected with the output of an oscillator;

c) the division ratio of the programmable frequency divider is determined by the state of the control input; and d) the output of the programmable frequency divider is connected with an input of the adjustable signal shaper.

7. An audio signal processor, comprising:

an audio output for outputting an audio output signal;

a control input for receiving control input signals;

an audio signal processing unit coupled between the control input and the audio output, the audio signal processing unit having a plural-tone generator circuit that generates a first indicator tone in response to receiving a first control input signal from the control input and generates a second indicator tone in response to receiving a second control input signal from the control input, the plural-tone generator circuit having a programmable frequency divider with an input and a division ratio, and an adjustable signal shaper that influences the signal shape of the indicator tone, the adjustable signal shaper being adjusted in accordance with the selected indicator tone by the state of the control input; and a phase-locked oscillator locked with a stereo pilot signal, the phase-locked oscillator producing an output signal that is applied to the input of the programmable frequency divider.

8. The audio signal processor of claim 7 wherein the pluraltone generator circuit comprises an oscillator that produces a tone signal, and wherein the frequency divider is configured to divide the tone signal using a first division ratio to produce the first indicator tone and divides the tone signal using a second division ratio to produce the second indicator tone.

9. The audio signal processor of claim 8 wherein the frequency divider is coupled to the control input, the frequency divider employing the first division ratio in response to receiving the first control signal from the control input and employing the second division ratio in response to receiving the second control signal from the control input.

10. The audio signal processor of claim 7 wherein the adjustable signal shaper produces at the audio output a first shaped indicator tone by adjusting a signal shape of the first indicator tone in a manner that is based on the first indicator tone and produces at the audio output a second shaped indicator tone by adjusting a signal shape of the second indicator tone in a manner that is based on the second indicator tone.

11. The audio signal processor of claim 7 wherein the adjustable signal shaper is coupled between the plural-tone generator circuit and the audio output, the adjustable signal shaper producing at the audio output first and second shaped indicator tones responsive to the first and second indicator tones, respectively, the adjustable signal shaper including:

a first frequency response-determining element;

a second frequency response-determining element; and a control switch response to the control input, the control switch connecting the first frequency response-determining element with the second frequency response-determining element to produce the first shaped indicator tone and disconnecting the first frequency response-determining element from the second frequency response-determining element to produce the second shaped indicator tone.

12. The audio signal processor of claim 11 wherein the first and second frequency response-determining elements are capacitances.

13. The audio signal processor of claim 11 wherein the first and second frequency response-determining elements are resistances.

14. The audio signal processor of claim 13 wherein at least one of the resistances is implemented as a switched capacitor.

15. An audio receiver, comprising:

an audio input for receiving an audio input signal;

an audio output for outputting an audio output signal;

a control input for receiving control input signals; and an audio signal processor coupled between the audio input and the audio output, the audio signal processor including:

a programmable tone generator circuit coupled to the control input, the programmable tone generator circuit having a programmable frequency divider with an input and a division ratio, the programmable tone generator circuit configured to generate a programmed indicator tone based on a control input signal received from the control input;

an output circuit that outputs the programmed indicator tone via the audio output; and a phase-locked oscillator locked with a stereo pilot signal, the phase-locked oscillator producing an output signal that is applied to the input of the programmable frequency divider.

16. The audio receiver of claim 15, further comprising:

a power amplifier connected between the audio signal processor and a loudspeaker, the power amplifier amplifying the audio output signal output by the audio signal processor and transmitting the amplified audio output signal to the loudspeaker.

17. The audio receiver of claim 15 wherein the programmable tone generator circuit comprises an oscillator that produces a tone signal, and wherein the frequency divider divides the tone signal using a first division ratio to produce a first indicator tone and divides the tone signal using a second division ratio to produce a second indicator tone.

18. The audio receiver of claim 17 wherein the frequency divider is coupled to the control input, the frequency divider employing the first division ratio in response to receiving a first control signal from the control input and employing the second division ratio in response to receiving a second control signal from the control input.

19. The audio receiver of claim 15 wherein the audio signal processor further includes:

an adjustable signal shaper that produces at the audio output a shaped indicator tone by adjusting a signal shape of the indicator tone in a manner that is based on the indicator tone.

20. The audio receiver of claim 15 wherein the programmable tone generator circuit alternatively produces first and second indicator tones and the audio signal processor further includes:

an adjustable signal shaper coupled between the plural-tone generator circuit and the audio output, the adjustable signal shaper producing at the audio output first and second shaped indicator tones responsive to the first and second indicator tones, respectively, the adjustable signal shaper including:

a first frequency response-determining element;

a second frequency response-determining element; and a control switch response to the control input, the control switch connecting the first frequency response-determining element with the second frequency response-determining element to produce the first shaped indicator tone and disconnecting the first frequency response-determining element from the second frequency response-determining element to produce the second shaped indicator tone.

21. The audio receiver of claim 20 wherein the first and second frequency response-determining elements are capacitances.

22. The audio receiver of claim 20 wherein the first and second frequency response-determining elements are resistances and at least one of the resistances is implemented as a switched capacitor.

23. An audio signal processor for an FM stereo apparatus, comprising:

an audio signal input, an audio signal output, and a control input with a state; and an audio signal processing unit connected between the audio signal input and the audio signal output, the audio signal processing unit comprising an integrated programmable indicator tone generator circuit to be driven via the control input, the indicator tone generator circuit producing at least two different indicator tone signals in accordance with the state of the control input, the indicator tone generator circuit further comprising a programmable frequency divider with an input and a division ratio, and an adjustable signal shaper that is configured to influence the signal shape of the indicator tone signal, the adjustable signal shaper being adjusted in accordance with the selected indicator tone signal by the state of the control input and further comprising an RC filter with a frequency response-determining capacitance, a filter control unit, and one or more switching devices connected with one or more additional capacitances, the adjustable signal shaper being adjusted by each of the switching devices switching one or more of the additional capacitances in parallel or in series with the frequency response-determining capacitances of the RC filter under the control of the filter control unit.

24. Audio signal processor for an FM stereo apparatus, comprising:

an audio signal input, an audio signal output, and a control input with a state; and an audio signal processing unit connected between the audio signal input and the audio signal output, the audio signal processing unit having an integrated programmable indicator tone generator circuit to be driven via the control input and configured to produce at least two different indicator tone signals in accordance with the state of the control input, the indicator tone generator circuit further comprising:

a programmable frequency divider with an input and a division ratio; and an adjustable signal shaper that influences the signal shaper of the indicator tone signal, the adjustable signal shaper being adjusted in accordance with the selected indicator tone signal by the state of the control input and further including an RC filter with a frequency response-determining resistor, a filter control unit, and one or more switching devices connected with one or more additional resistors, the adjustable signal shaper being adjusted by each of the switching devices switching one or more of the additional resistors in parallel or in series with the frequency response-determining resistor of the RC filter under the control of the filter control unit.

25. An audio signal processor for an FM stereo apparatus, comprising:

an audio signal input, an audio signal output, and a control input with a state; and an audio signal processing unit connected between the audio signal input and the audio signal output, the audio signal processing unit having an integrated programmable indicator tone generator circuit to be driven via the control input and configured to produce at least two different indicator tone signals in accordance with the state of the control input, the indicator tone generator circuit further comprising:

a programmable frequency divider with an input and a division ratio; and an adjustable signal shaper that influences the signal shaper of the indicator tone signal, the adjustable signal shaper being adjusted in accordance with the selected indicator tone signal by the state of the control input and further including an RC filter with a frequency response-determining resistor, a filter control unit, and one or more switching devices connected with one or more additional resistors, the adjustable signal shaper being adjusted by each of the switching devices switching one or more of the additional resistors in parallel or in series with the frequency response-determining resistor of the RC filter under the control of the filter control unit.

* * * * *